United States Patent [19]
Peruglia et al.

[11] 3,727,988
[45] Apr. 17, 1973

[54] FAILSAFE HYDRAULIC BRAKING APPARATUS FOR MOTOR VEHICLES

[75] Inventors: Marco Peruglia, Turin; Giancarlo Michellone, Cambiano, both of Italy

[73] Assignee: Fiat Societa per Azioni, Turin, Italy

[22] Filed: June 2, 1972

[21] Appl. No.: 259,313

[30] Foreign Application Priority Data

June 4, 1971 Italy..........................68901-A/71

[52] U.S. Cl..................................303/6 C, 303/21 F
[51] Int. Cl................................................B60t 13/18
[58] Field of Search..................303/6 C, 21 F, 84 A; 137/512.2, 512.3, 517

[56] References Cited

UNITED STATES PATENTS

| | | | |
|---|---|---|---|
| 3,545,814 | 10/1970 | Marcetts | 303/6 C |
| 3,637,963 | 1/1972 | Wellman | 303/6 C X |
| 3,674,954 | 7/1972 | Kish & Swanson | 303/6 C X |

*Primary Examiner*—Allen N. Knowles
*Assistant Examiner*—Gene A. Church
*Attorney*—Richard C. Sughrue et al.

[57] ABSTRACT

The invention relates to an hydraulic anti-skid braking system which will operate to produce at least partial braking, that is braking of at least some of the wheels of a vehicle, even in the event of failure of part of the system causing a loss of pressure in that part. The braking system is normally servo assisted but is arranged to produce braking without servo assistance in the event of a failure of the engine of the vehicle or the pump which produces the servo assistance. The braking circuit is formed in two independent parts each of which comprises a loop around which fluid is continuously circulated by a pump driven by the engine, the pressure of fluid in the loop is controlled by a modulator valve which is closed when the brakes are operated, to increase the pressure and operate braking actuators which are either in series in the loop or in static branches of the circuit communicating with the loop. A pressure sensitive valve is provided to ensure that fluid always flows in the correct direction around the loop even in the vent of a failure causing an adverse pressure differential.

6 Claims, 6 Drawing Figures

FAILSAFE HYDRAULIC BRAKING APPARATUS FOR MOTOR VEHICLES

BACKGROUND OF THE INVENTION

The present invention relates to hydraulic braking systems for motor vehicles, and particularly to improved hydraulic braking systems having a number of safety features. One feature of braking systems of this invention is that they can continue to operate to provide some degree of braking even in the event of failure of a part of the circuit.

Another feature of some embodiments of the invention is that cooling of the braking actuators can be effected using the same hydraulic fluid which operates the actuators, without requiring any separate cooling fluid for the braking actuators and without requiring special provision for air circulation around the actuators.

SUMMARY OF THE INVENTION

According to the present invention, there is provided an hydraulic braking system for a pair of wheels of a motor vehicle, comprising an hydraulic circuit including a pump operable to circulate hydraulic brake fluid around a part of the circuit formed as a loop which includes a modulator valve operable by a brake pedal to restrict the flow of fluid around the said loop to increase the pressure in the fluid between the pump and the modulator valve so as to operate braking actuators of the said pair of wheels, which are connected in said circuit, characterized in that in the event of failure of the pump, the modulator valve is operable, when the brake pedal is depressed to pressurize the fluid in the part of the circuit containing the brake actuators and in that the circuit includes a first retainer valve between the said pump and the said modulator valve which allows fluid flow in a direction from the pump to the modulator valve but which prevents fluid flow in the opposite direction.

Various other features and advantages of the invention will become apparent during the course of the following description of several preferred embodiments of the invention which is given purely by way of non-restrictive example.

DESCRIPTION OF THE PREFERRED EMBODIMENTS

Figure 1:
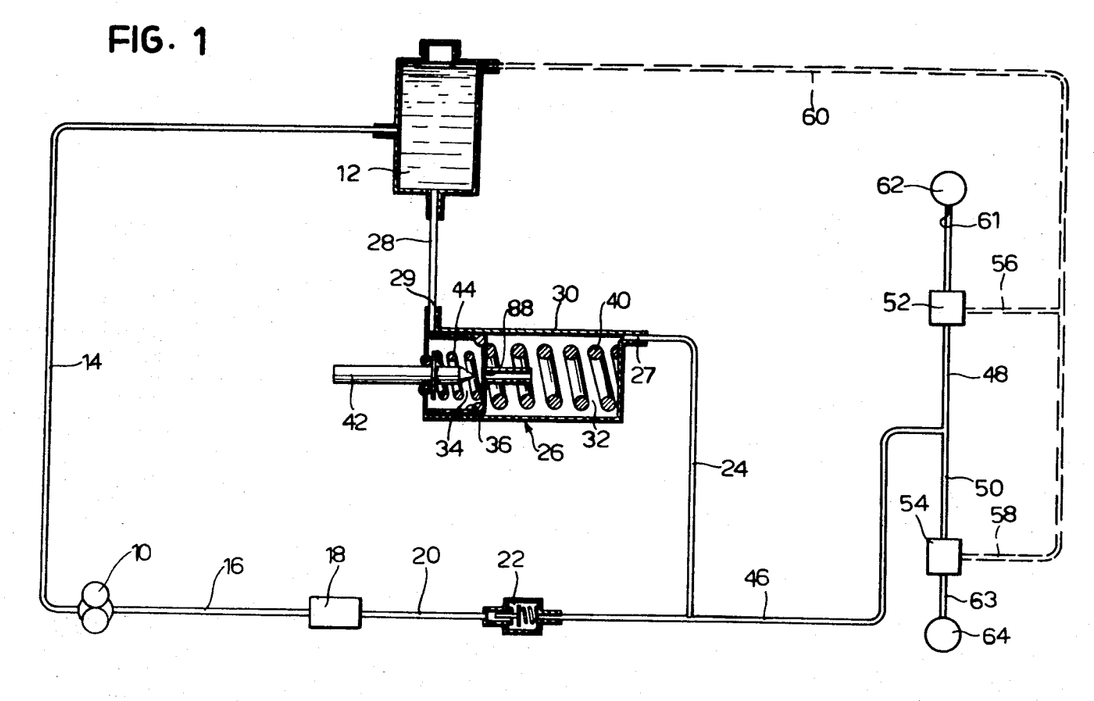
FIG. 1 is a schematic circuit diagram of a part of a braking system in which the circuit for the front wheels is entirely separated from the circuit for the rear wheels, only the circuit for the front wheels being shown in the drawing.

Referring now to FIG. 1 there is shown part of a hydraulic braking circuit, the parts shown being for braking a pair of wheels, which may be either the front or rear wheels of a motor vehicle. In practice a motor vehicle would be fitted with two identical braking circuits as shown in FIG. 1, but controlled by a single control member which will be described below.

In the circuit of FIG. 1 a volumetric pump 10 driven by the engine (not shown) of the vehicle draws hydraulic fluid from a reservoir 12, through a pipe 14 and pumps it through a pipe 16 to a pressure switch 18 which is operative in the event of failure of the pump or the engine driving it, or in the event of a rupture in the pipe from the reservoir leading to a fall in pressure, stops the action of an anti-skid device (not shown) which does not form part of the invention and hence is neither illustrated nor described. From the pressure switch 18 a pipe 20 leads to a retainer valve 22, and from there a pipe 24 is connected to the inlet of a modulator valve 26 the outlet of which is connected through a pipe 28 to the hydraulic fluid reservoir 12.

The modulator valve 26 comprises a cylinder 30 within which there is slidable a piston 36 which has an axial passageway 38. The piston 36 separates the cylinder 30 into two chambers 32 and 34. A return spring 40 normally urges the piston 36 to the left in the orientation shown in FIG. 1. A plunger 42 having a tapered or conical end face is guided in a hole in the end wall of the cylinder 30 and biased to the left, in the orientation shown in FIG. 1, by a spring 44 which is considerably weaker than the spring 40. When the plunger 42 is moved against the action of the spring 44 it progressively closes the holes 38 in the piston 36 with its tapered or conical end.

The outlet of the retainer valve 22 is also connected via a pipe 46 and two branch pipes 48 and 50 to respective anti-skid distributor valves 52, 54 which normally establish communication between the pipe 46 and respective brake actuators 62 and 64 but which can be controlled to discharge the hydraulic fluid from the brake actuators 62, 64 to the reservoir 12 by an anti-skid control device (not shown), which does not form part of the invention and which will therefore not be described in detail.

The plunger 42 is linked to the brake pedal by means of a rocker (not shown) to which is also connected a corresponding plunger of a braking circuit for the other two wheels of the vehicle. Adjustment of the pin of the rocker is effected "una tantum" to adjust the ratio between the front and rear braking pressures to suit the individual conditions such as where special roads are travelled, or to suit the conditions in the case of motor racing.

Under normal conditions when the vehicle is operating hydraulic fluid is delivered from the volumetric pump 10 through the pipe 16, the pressure switch 18, the pipe 20, the retainer valve 22, and the pipe 24, it passes freely through the modulator valve 26 from the inlet port 27 to the outlet port 29, and returns to the reservoir 12, through the pipe 28. Hence there is no appreciable pressure in the pipe 46 so that neither of the brake actuators 62, 64 are operated.

When the brake pedal is operated the plunger 42 is moved against the resistance of the spring 44 and the passageway 38 in the piston 36 is progressively restricted giving rise to an increase of pressure upstream of the modulator valve 26 in the loop circuit just described. The pressure in the pipe 46 and in the branches 48 and 50 thus rises and the brake actuators 62, 64 are operated. It will be appreciated that the force required on the plunger 42 to effect braking is rather less than the force required to create a given braking pressure in the actuators so that the system provides servo assistance under normal conditions.

If the engine stops or in the event of failure of the volumetric pump 10 so that the circulating flow of fluid ceases, the plunger 42 presses the piston 36 against the resistance of the spring 40, completely closing the passageway 38 of the piston 36 so that the piston 36 acts to pump fluid from the port 27 into the pipe 24. The retainer valve 22 prevents this fluid from flowing towards the volumetric pump 10 and thence to the reservoir through the pipe 14. Instead, the fluid flows into the pipe 46 and from there into the branches 48 and 50 so as to exert a pressure on the brake actuators 62, 64 to operate them. In this "emergency braking" mode of operation the force required on the plunger to move the piston is that required to create the braking pressure in the circuit so that it will be seen that the system operates without servo-assistance in this mode.

In the event of total failure of one of the two braking circuits of the motor vehicle, then since they are entirely independent the other is always available to produce braking of at least two of the wheels of the vehicle. The anti-skid device will continue to operate normally in one part of the circuit, in the event of failure of the other part of the circuit but will be switched off automatically in either circuit in the event of a failure in the loop part of the circuit, that is in circumstances such as when the modulator valve 26 operates as a pump.

Figure 2:
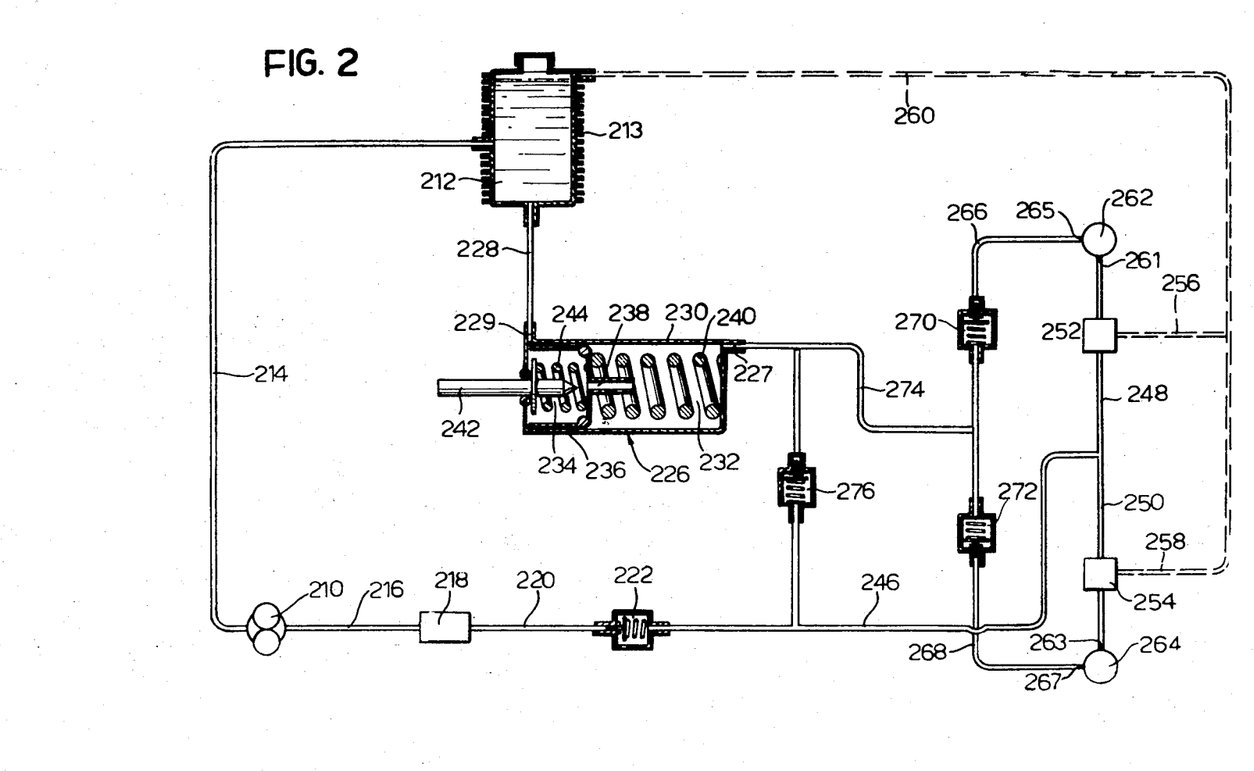
FIG. 2 is a circuit diagram of a modified form of the front circuit of the braking system of FIG. 1, in which the brake actuators are cooled.

In FIG. 2 there is shown a system similar to the system illustrated in FIG. 1 but modified in order to provide cooling of the brake actuators.

Corresponding components in all of the drawings are referred to by the same reference numerals as those used in FIG. 1 but with a prefix representing the figure before each and a suffix a or p representing the corresponding component of a front or rear braking circuit respectively, where both circuits are illustrated.

In FIG. 2 hydraulic fluid is delivered from a pump 210 but instead of going directly to a modulator valve 226 it is passed first through a pipe 246 to the braking actuators 262, 264 via respective hydraulic distributor valves 252, 254. The actuators 262, 264 of this embodiment are fitted with inlet and outlet ports 261, 263 and 265, 267 respectively so that hydraulic fluid can flow through them, the actuators being operated when the pressure of the hydraulic fluid increases regardless of its flow, that is whether there is any flow or not. The outlet ports 265, 267 are connected through respective pipes 266, 268 and respective retainer valves 270, 272 to a pipe 274 which leads to the inlet port 227 of the modulator valve 226. The inlet port 227 of the modulator valve 226 is also connected to the pipe 246 between the retainer valve 222 and the hydraulic distributors 252 and 254 by a pipe including a further retainer valve 276 which allows fluid flow in a direction from the inlet port 227 to the pipe 246 but which prevents fluid flow in the opposite direction. In normal operation this valve is shut since there is a slight pressure difference across it when fluid is circulating through the loop which is completed by a pipe 228 connecting the modulator valve 226 to the reservoir 212, and which in this case is constructed with a plurality of cooling fins 213, so that it can act as a heat exchanger between the hydraulic fluid and the surroundings. In this case the fluid circulates through the brake actuators 262, 264 when the pump 210 is working (and providing the plunger 242 is not entirely closing the opening 238), thereby removing their heat, which is then given up by the reservoir 212 to the surroundings.

As with the embodiment of FIG. 1 operation of the modulator valve 226 reduces the flow through the pipe 274 to the reservoir 212, thus increasing the pressure in the loop circuit and therefore in the brake cylinders 262, 264.

If the engine stops or the pump 210 fails then, as in the embodiment of FIG. 1, the piston 242 is moved by the plunger to increase the braking pressure without servo-assistance; again the anti-skid control device (not shown) is switched off by the pressure switch 218. In this event the valve 276 operates to allow fluid to flow to the pipe 246 and thence to the brake actuators 262, 264, since the retainer valves 270 and 272 prevent fluid flow in the opposite direction from the normal circulation in the loop. These valves 270 and 272 are necessary, however, to ensure proper anti-skid operation under normal circumstances.

During normal braking the flow of fluid through the reservoir 212 varies in inverse proportion to the braking pressure, and returns to its original value as soon as the brake pedal is released, or whenever the anti-skid device operates to release the braking pressure when skidding is imminent. This should normally be sufficient to cope with the risk of boiling, brought about by any drop in pressure with increase of temperature in the brake actuators.

It is possible to introduce into the tank 212 a thermometer (not illustrated) which will indicate to the driver of the motor vehicle the temperature of the hydraulic braking fluid, and consequently the temperature of the front and rear brake actuators. Again the presence of two entirely independent circuits ensures that at least some braking action is available, even in the event of total failure of one of the circuits.

Figure 3:
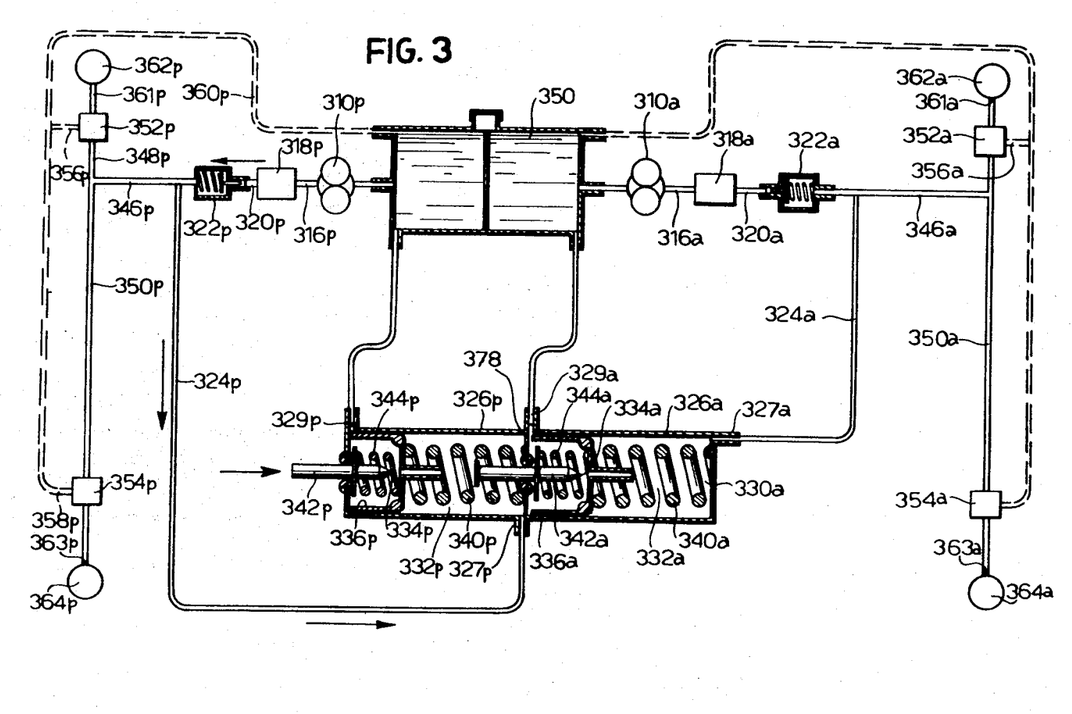
FIG. 3 illustrates a second embodiment of the invention which is a braking system including two pumps but having only one modulator of a form which will be referred to hereinafter as a "duplex" modulator, that is one having two separate operating chambers for two separated parts of a circuit.

In FIG. 3 there is shown a circuit diagram of a second embodiment of the invention illustrating a complete braking system for the front and rear wheels of a motor vehicle.

This second embodiment also comprises two circuits having separate pumps and reservoirs for the front and the rear wheels. In this embodiment however, the two circuits are not entirely independent as are the two circuits of the preceding embodiment since the two modulator valves are replaced in this latter embodiment by a single modulator valve of the "duplex" type which will be described below.

The "duplex" modulator is formed in two parts 326a, and 326p which are separated by a baffle 378 which has an opening which guides a plunger 342a of the part 326a which is otherwise identical to the modulator valve 26 of the preceding embodiment. The part 326a has an inlet port 327a, an outlet port 329a, springs 340a, 344a, and a piston 336a. The plunger 342a is operated by the fluid pressure in the other part 326b of the modulator valve 326.

The rear part 326p of the modulator valve 326 is constructed identically with the front part 326a, and hence with the modulator 26 of FIG. 1, except that the plunger 342p is operated directly by the brake pedal (not illustrated) without the interposition of a rocker as in the preceding embodiment since only the one plunger is connected thereto the other plunger 342a being operated, as mentioned above, by the pressure in the chamber 332p caused by the operation of the plunger 342p.

The remainder of the circuit is the same as two circuits of the type described in relation to FIG. 1.

Each of the two parts of the system, however, has the same characteristics of safety and protection from pump breakages, etc., as the embodiment of FIG. 1. In particular, in the event of a total loss of fluid pressure in the circuit containing the rear chamber 332p of the modulator valve the plunger 342p, when moved by the brake pedal (not shown) pushes the piston 336p to the right, in the orientation shown in FIG. 3, until it engages the end of the plunger 342a to operate it.

Figure 4:
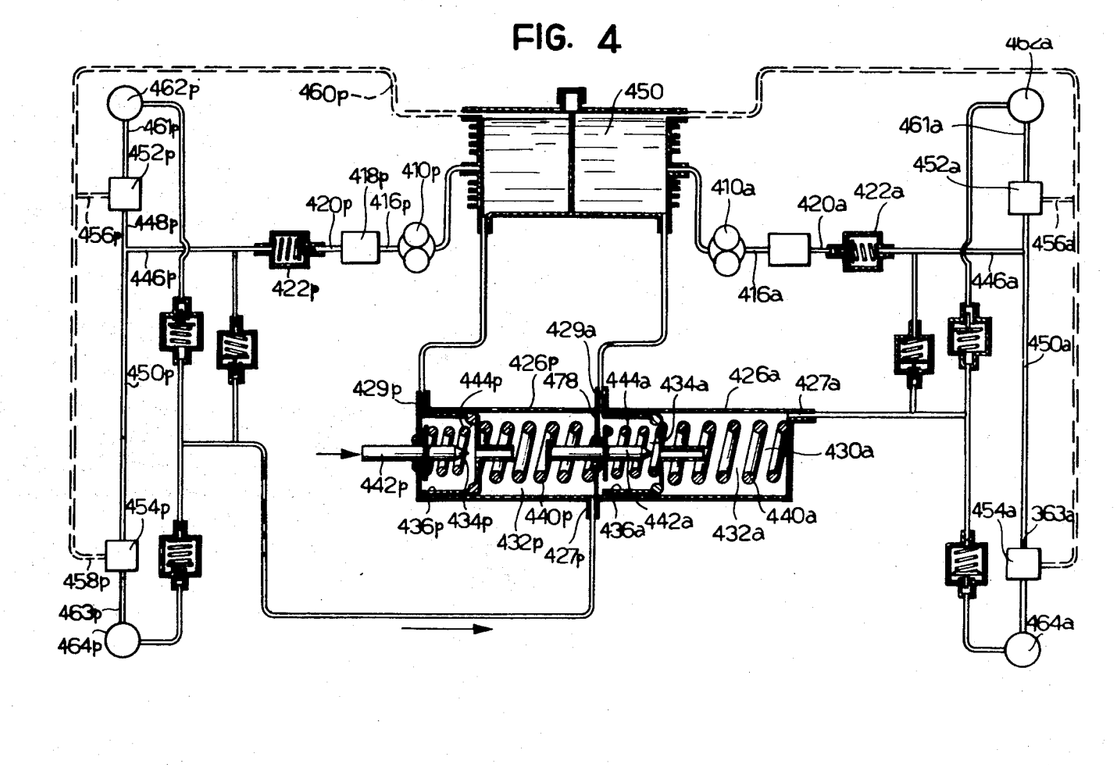
FIG. 4 shows a modified form of the braking system of FIG. 3, in which the brake actuators are cooled.

In FIG. 4 there is shown a modified embodiment which is like the braking system of FIG. 3, but which also operates to cool the brake actuators. The differences between this circuit and the circuit of FIG. 3 are that the braking actuators 462a, 464a, 462p and 464p are connected into the loop circuit, to receive a throughflow of circulating fluid in a manner similar to the embodiment of FIG. 2.

It is not therefore necessary further to describe either the construction or the operation of this embodiment since these follow directly from the description of the systems illustrated in FIGS. 2 and 3 respectively.

Figure 5:
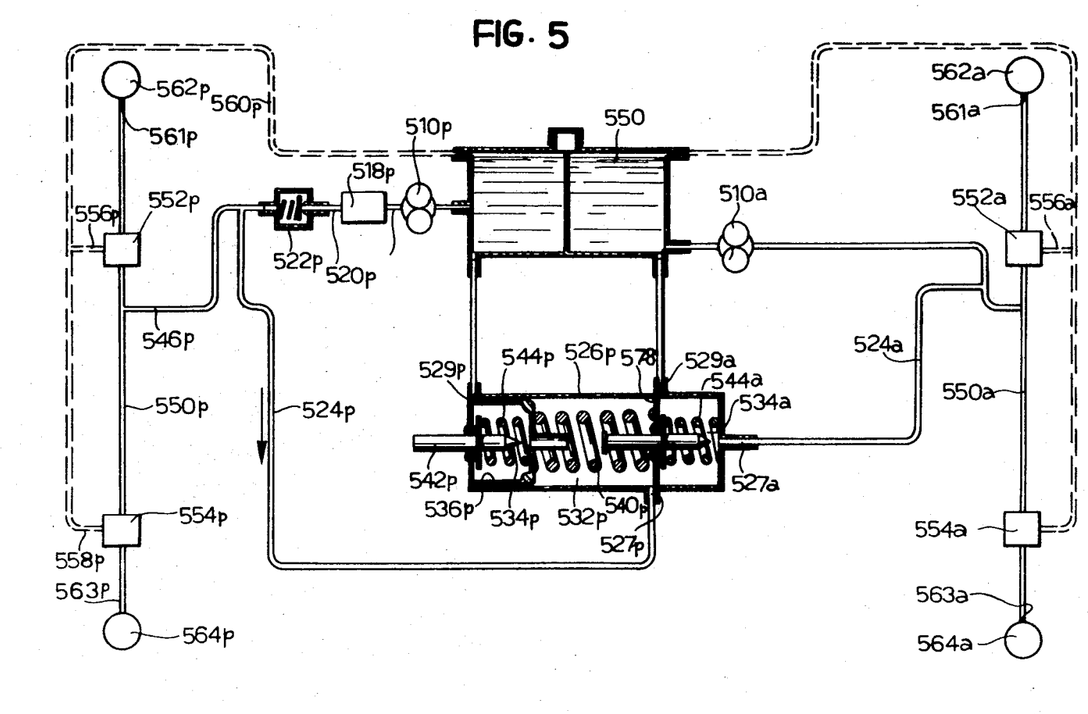
FIG. 5 illustrates a third embodiment of the invention which has two pumps and a "duplex" modulator.

In FIG. 5 there is shown a third embodiment of a braking system according to the invention.

This embodiment is a simplified version of the embodiment illustrated in FIG. 3, and differs from it in that the "duplex" modulator valve 526 is simplified. The modulator valve 526 includes a chamber 526a having no piston so that it does not operate to increase the pressure in the circuit of the front brakes in the "emergency braking" situation without servo-assistance in the event of failure of the pump. Emergency braking is thus available only to the rear brake circuit. This embodiment is cheaper to manufacture by virtue of the fact that a retainer valve in the front circuit is not required, as can be seen from FIG. 5.

Figure 6:
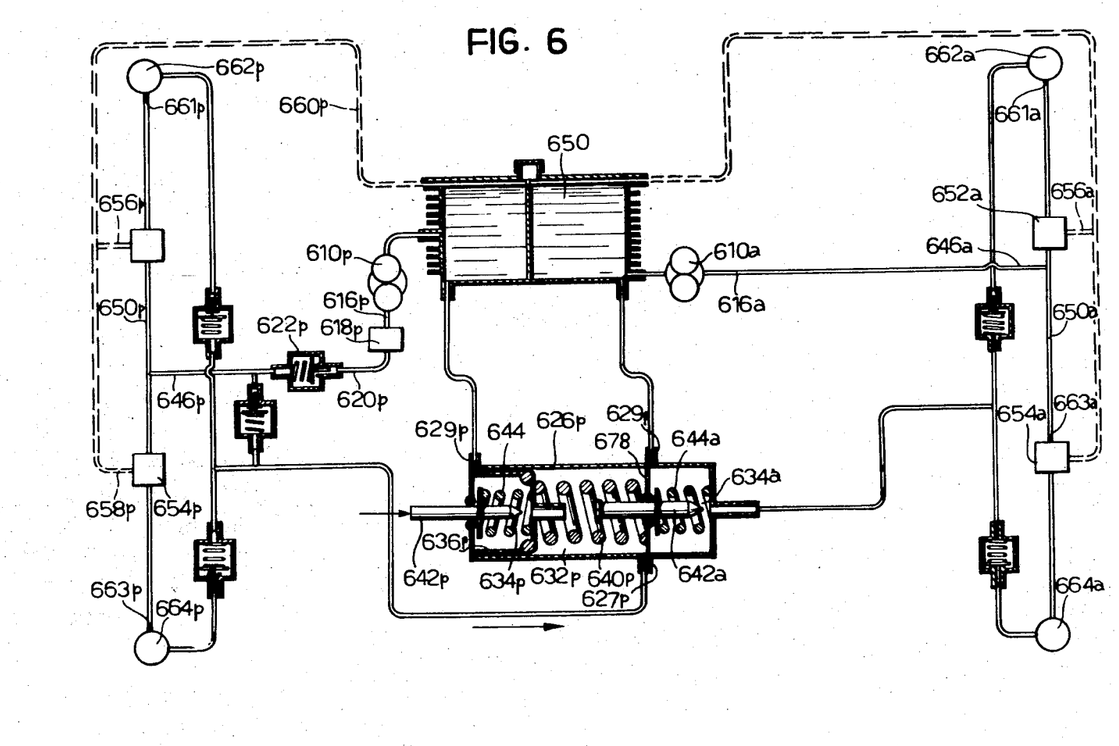
FIG. 6 illustrates a modified form of the braking system of FIG. 5, in which the brake actuators are cooled.

FIG. 6 illustrates a modified circuit similar to the circuit of FIG. 5, in which the brake actuators are cooled by the brake fluid in a manner similar to that of the embodiments of FIGS. 2 and 4, by including the brake actuators in branches of the loop circuit around which the hydraulic fluid is circulated. Again, the operation of this embodiment follows from the description of the preceding embodiments and so will not be described again as this would be merely repetitious.

Naturally, many modifications and alterations can be made to the embodiments of the invention described by way of example without departing from the spirit and scope of the invention.

We claim:

1. In a hydraulic braking system for two of the wheels of an automobile, of the type in which part of the circuit is formed as a loop including:
   reservoir means,
   pump means circulating hydraulic fluid from said reservoir means around said loop and back to said reservoir means;
   modulator valve means;
   brake pedal means, means operatively connecting said brake pedal means to said modulator valve means;
   brake actuator means, means connecting said brake actuator means to said circuit between said pump means and said modulator valve means, said modulator valve means operating, when controlled by said brake pedal means, to restrict the flow of fluid around said circuit to increase the pressure in said hydraulic fluid between itself and said pump means such as to operate said brake actuator means, the improvement comprising:
   first one way valve means in said circuit between said pump means and said modulator valve means, said first one way valve means operating to allow fluid to flow through it from said pump means to said modulator valve means and to prevent fluid from flowing through it from said modulator valve means to said pump means,
   said modulator valve means being operable to pressurize the fluid in the part of said circuit containing said brake actuator means in the event of a failure of said pump means.

2. The braking system of claim 1 wherein said brake actuator means are located in a branch of said circuit connected to said loop part of said circuit at a junction located between said pump means and said modulator valve means, said first one way valve means being connected in said loop part of said circuit between said junction and said pump means.

3. The braking system of claim 1 further comprising:
   inlet and outlet ports on said braking actuator means, said braking actuator means being connected in parallel in respective branches of said loop part of said circuit,
   respective second one way valve means in respective said branches of said loop part of said circuit between said brake actuator means and said modulator valve means, said second one way valve means allowing fluid flow in a direction from said brake actuator means to said modulator valve means and preventing fluid flow in the opposite direction,
   third one way valve means connecting said modulator valve means to said loop circuit between said first one-way valve means and said brake actuator means, said third one way valve means allowing fluid flow through itself from said modulator valve means to said loop circuit and preventing fluid flow through itself from said loop circuit to said modulator valve means.

4. The hydraulic braking system of claim 1 wherein said reservoir means of said circuit is provided with heat exchanger means for exchanging heat from said braking fluid therein to the surroundings thereof.

5. An hydraulic braking circuit for two pairs of wheels of an automobile comprising respective said hydraulic braking systems of claim 1 for each pair of wheels wherein there are means connecting said modulator valve means of each system to said brake pedal means whereby operation of said brake pedal means causes said two modulator valve means to operate simultaneously.

6. An hydraulic braking circuit for two pairs of wheels of an automobile comprising respective said hydraulic braking systems of claim 1 for each pair wherein there are means connecting said modulator valve means of said two systems together and, means connecting one said modulator valve means to said brake pedal means, said other modulator valve means being operated by the pressure in said one modulator valve means.

* * * * *